US008803852B2

(12) United States Patent
Tsai et al.

(10) Patent No.: US 8,803,852 B2
(45) Date of Patent: Aug. 12, 2014

(54) TOUCH INPUT DEVICE AND ELECTRONIC DEVICE

(75) Inventors: Chung-Hsuan Tsai, New Taipei (TW); Chun-Chung Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 193 days.

(21) Appl. No.: 13/340,694

(22) Filed: Dec. 30, 2011

(65) Prior Publication Data
US 2012/0182236 A1    Jul. 19, 2012

(30) Foreign Application Priority Data
Jan. 14, 2011    (TW) .................................. 10101327

(51) Int. Cl.
*G06F 3/033*    (2013.01)

(52) U.S. Cl.
USPC ............................ 345/184; 345/173; 345/174

(58) Field of Classification Search
USPC .............. 345/173, 174, 179, 184; 361/679.18
See application file for complete search history.

(56) References Cited

U.S. PATENT DOCUMENTS

| 8,139,347 B2 * | 3/2012 | Chiang et al. ............ 361/679.18 |
| 8,581,866 B2 * | 11/2013 | Park et al. ...................... 345/173 |
| 2006/0071915 A1 * | 4/2006 | Rehm ............................. 345/173 |
| 2009/0160783 A1 * | 6/2009 | Yang et al. ..................... 345/173 |
| 2011/0074733 A1 * | 3/2011 | Makinen et al. .............. 345/174 |
| 2011/0148785 A1 * | 6/2011 | Oda et al. ....................... 345/173 |
| 2011/0157085 A1 * | 6/2011 | Philipp ........................... 345/174 |
| 2011/0216013 A1 * | 9/2011 | Siotis ............................. 345/173 |
| 2013/0271434 A1 * | 10/2013 | King-Smith et al. ......... 345/179 |

* cited by examiner

*Primary Examiner* — Thuy Pardo
(74) *Attorney, Agent, or Firm* — Novak Druce Connolly Bove + Quigg LLP

(57) ABSTRACT

A touch input device includes a touch pad and a switch. The touch pad has a floating side. The switch is positioned on the touch pad. The floating side is permitted to move down to enable the switch to generate input commands when a pressure is exerted on the floating side.

20 Claims, 6 Drawing Sheets

TOUCH INPUT DEVICE AND ELECTRONIC DEVICE

BACKGROUND

1. Technical Field

The present disclosure relates to input devices, and particularly to a touch input device and an electronic device using the input touch device.

2. Description of Related Art

Touch input devices, such as touch pads are a common feature of laptop computers. Two clicking buttons equivalent to a left and a right buttons on a standard mouse are commonly positioned in the front sides or back sides of the touch pad, and occupy space.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
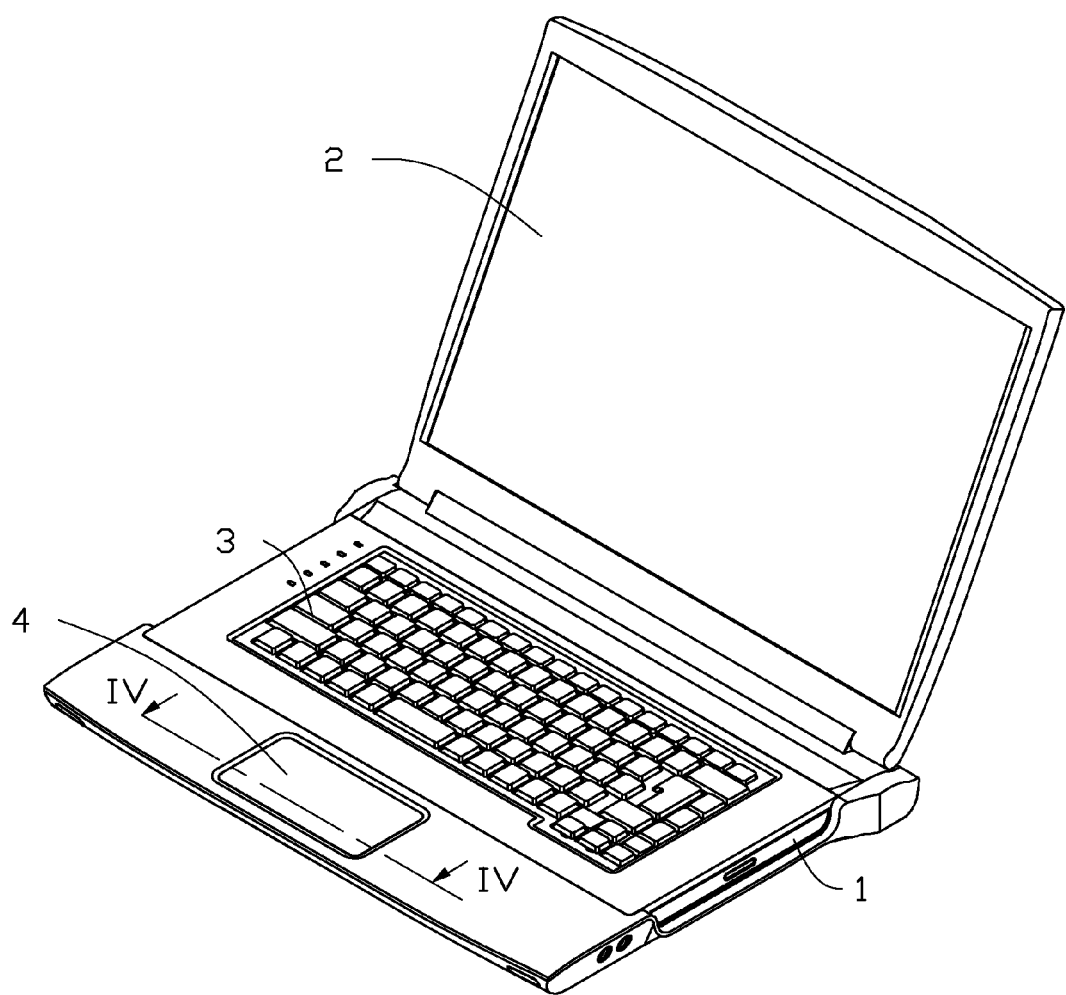
FIG. 1 is an isometric view of an electronic device with a touch input device.

FIG. 1, an electronic apparatus includes a main body 1, a cover 2 rotatably coupled to the main body 1. A keyboard 3 and a touch input device 4 both are positioned on the main body 1. The cover 2 is coupled to the rear side of the main body 1, the touch input device 4 is adjacent to the front side of the main body 1, and opposite to the rear side. The keyboard 3 is positioned between the rear side and the touch input device 4. The electronic apparatus may be a notebook computer, an electronic book, a PDA, for example. In this embodiment, the notebook computer is used as a example, and the main body 1 is the host of the notebook computer, and the cover 2 is the display of the notebook computer.

Figure 2:
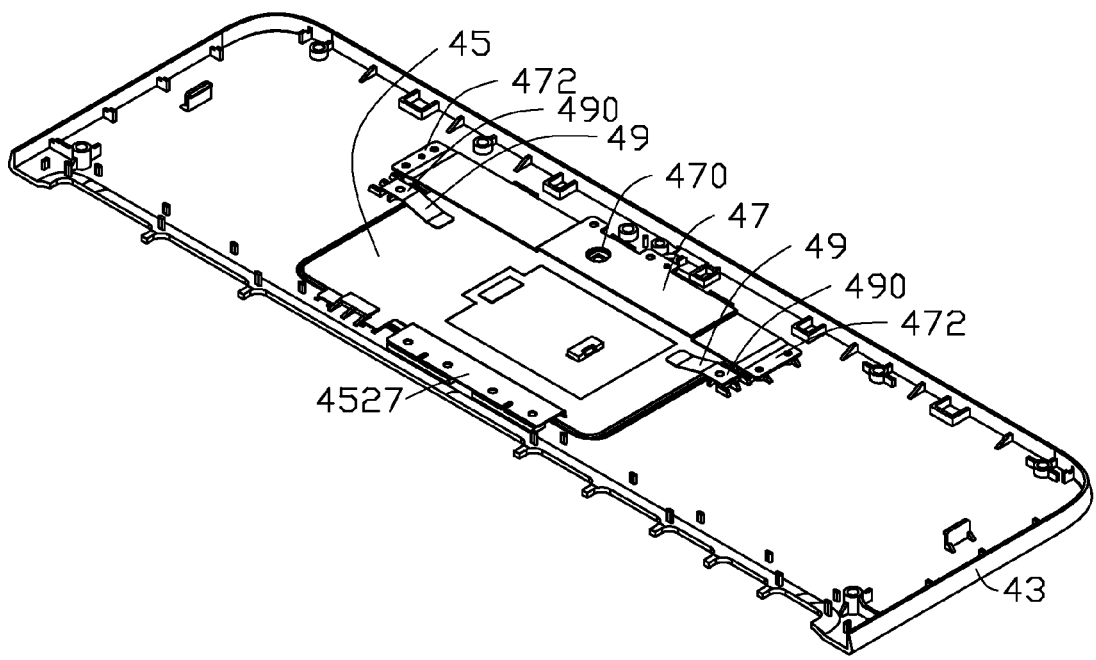
FIG. 2 is a bottom view of the touch input device in FIG. 1.
Figure 3:
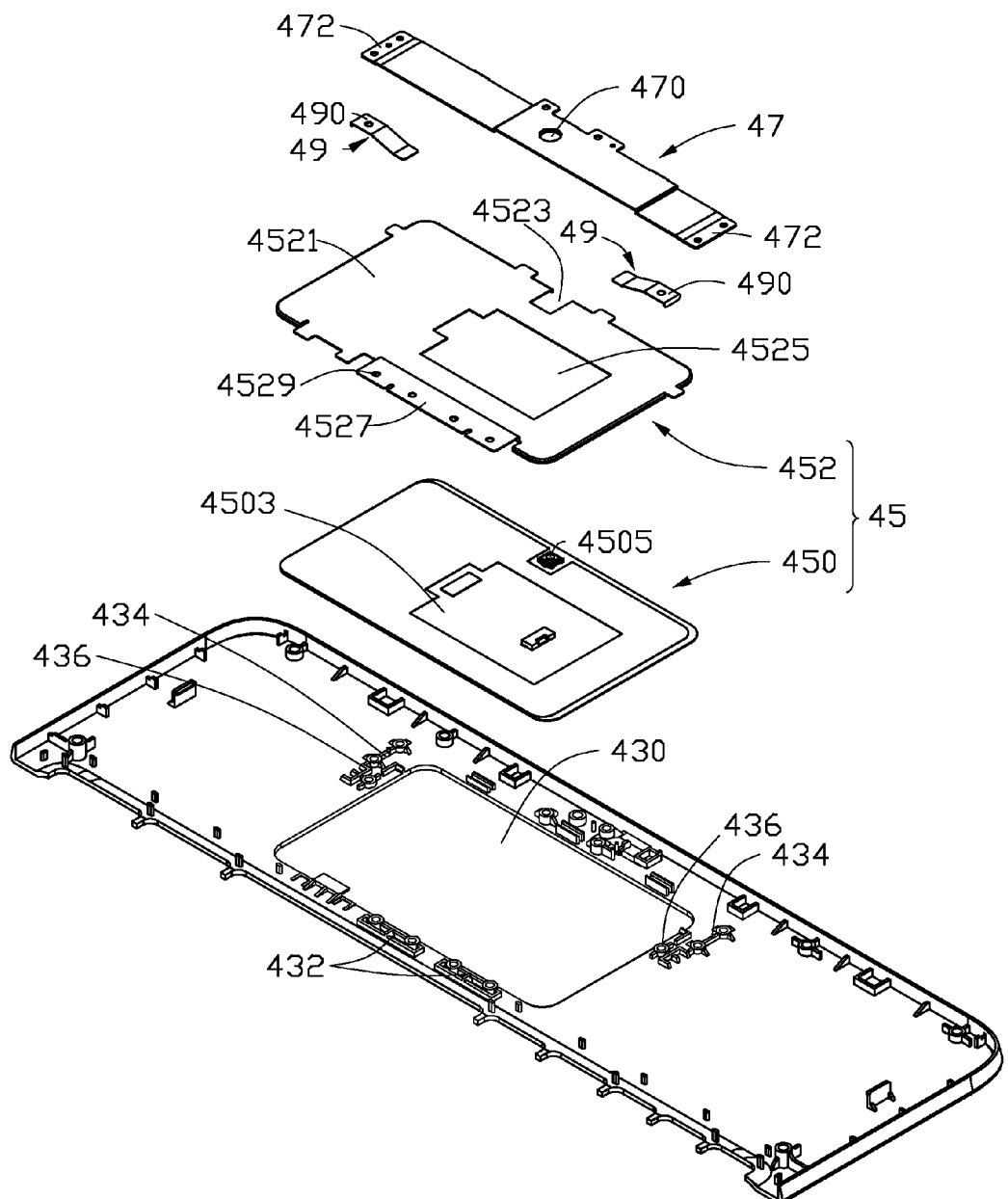
FIG. 3 is exploded view of touch input device in FIG. 2.

FIGS. 2-3, the touch input device 4 includes a frame 43, a touch pad 45, a supporting member 452 mounted to the frame 43 to secure the touch pad 45 to the frame 43. A switch 4505 positioned on the touch pad 45, two elastic members 49 attached to the touch pad 45, and an actuating member 47 for actuating the switch 4505.

The frame 43 is the whole or a part of an upper housing of the main body 1, and faces the cover 2. The frame 43 defines a first opening 430. The frame 43 further defines a plurality of first securing posts 432, a plurality of second securing posts 434, and a plurality of third securing posts 436 around the opening 430. The first, second, and third securing posts 432, 434 and 436 are anchors integrated with the frame 43. The first securing posts 432 are arranged in a line and positioned between one edge of the opening 430 and the keyboard 3. The second securing posts 434 are arranged in two lines, and each line of the second securing posts 434 is respectively adjacent to one of another two opposite edges of the opening 430. The third securing posts 436 are respectively positioned between the second securing posts 434 and the opening 430.

The top surface of the touch pad 45 protrudes out of the frame 43 via the first opening 430 to enable a user to touch it with fingers or a stylus, where the touch pad 45 can translate the touches on the top surface into input commands The bottom surface of the touch pad 45 sits a circuit board 4503.

The supporting member 452 is made of metal. The supporting member 452 includes a rectangle main board 4521, and a first securing part 4527 protruding from one edge of the main board 4521. A gap 4523 and a second opening 4525 are defined in the main board 4521. The gap 4523 is positioned at another edge of the main board 4521 away from the first securing part 4527. The second opening 4525 is positioned at the center of the main board 4521. The upper surface of the main board 4521 is attached to the bottom surface of the touch pad 45, and the circuit board 4503 is positioned in the second opening 4525. The first securing part 4527 is a long and narrow flexible strip, and defines a plurality of securing holes 4529 arranged in a line. The first securing part 4527 is fixed to the plurality of the first securing posts 432 via a plurality of screws, thus the one edge of the supporting member 452 is secured in the frame 43, and the opposite edge of the supporting member 452 is free. Since the first securing part 4527 is flexible, a side of the touch pad 45 corresponding to the free edge of the supporting member 452 can be moved up and down. In other words, the side of the touch pad 45 corresponding to the free edge of the supporting member 452 acts as a floating side (not shown) which is permitted to move when a force is exerted on it.

Figure 4:
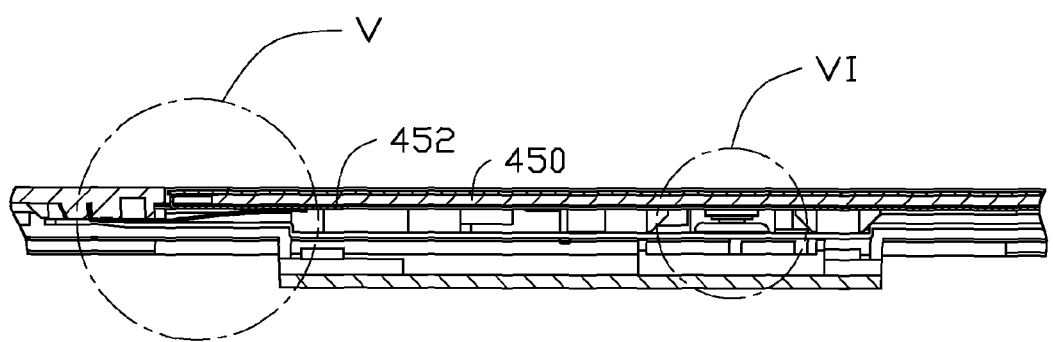
FIG. 4 is a cross-section view taken along the line IV-IV of FIG .1.
Figure 5:
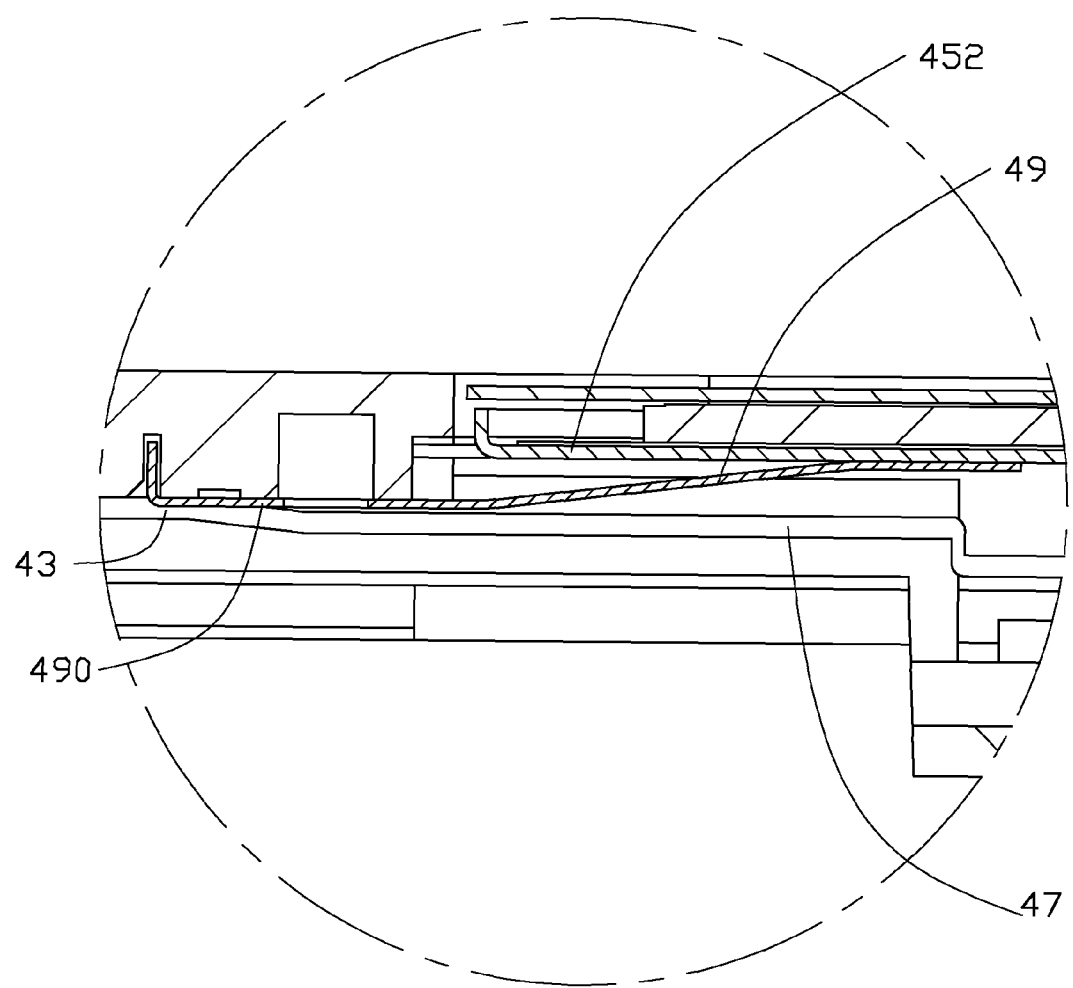
FIG. 5 is an enlarged view of a circled portion V of FIG. 4.
Figure 6:
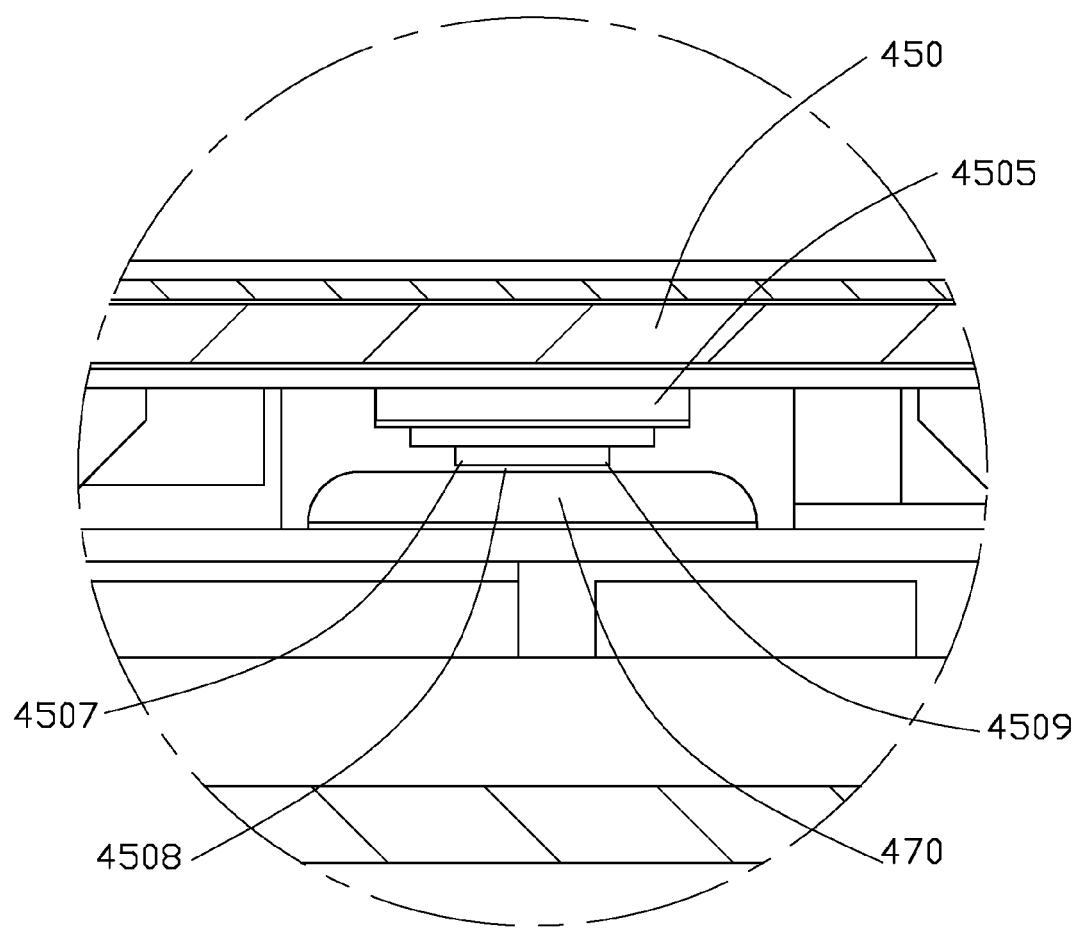
FIG. 6 is an enlarged view of a circled portion VI of FIG. 4.

Referring to FIGS. 4-6, each of the two elastic members 49 includes two opposite ends, and the two opposite ends of the elastic member 49 are not one flat surface. One end of the elastic member 49 is attached to the free edge of the supporting member 452 and the bottom surface of the main body 4521, the other end of the elastic member 49 is bent towards the frame 43 and secured to one of the third securing posts 436. When the touch pad 45 moves down, the two elastic members 49 deform and provide a force to enable the touch pad 45 to move up.

The switch 4505 is positioned on the bottom surface of the touch pad 45, and is capable of protruding out of the supporting member 452 from the gap 4523. The switch 4505 act as click buttons of a mouse (not shown). A first touch point 4507 and a second touch point 4509 are positioned on two opposite sides of the switch 4505. The two opposite sides of the switch 4505 are located on the left and right side of the touch pad 45.

The actuating member 47 is secured on the frame 43 and is positioned below the touch pad 45. The actuating member 47 is a metallic strip having two lower end portions and a raised middle portion. The actuating member 47 includes a protrusion 470 positioned on the middle of the actuating member 47, and two second securing parts 472 positioned on the two opposite ends of the actuating member 47. The protrusion 470 faces the switch 4505 via the gap 4523. The second securing parts 472 are secured to the plurality of the second securing posts 434 to enable the two ends of the actuating member 47 to be fixed to the frame 43. There is a space 4508 between actuating member 47 and the supporting member 452 thus, the touch pad 45 is capable of moving down in the space 4508.

In operation, a user presses the left or the right ends of the floating side of the touch pad 45. The corresponding elastic member 49 is depressed the left or the right ends of the floating side of the touch pad 45 are pressed down, and the first touch point 4507 or the second touch point 4509 contacts with the protrusion 470. At this time, the first touch point 4507 or the second touch point 4509 is actuated to enable the circuit board 4503 to generate the commands in response to the operation from the user. When the pressure on the touch pad 45 is released, the corresponding elastic member 49 rebounds to enable the touch pad 45 to return to the original state, the first touch point 4507 or the second touch point 4509 departs from the protrusion 470, at this point, one operation for inputting the commands ends.

Moreover, in another embodiment, two switches each with one touched point can replace the switch 4505. The actuating member 47 defines two protrusions. The two switches are positioned on the bottom surface of the touch pad 45 at intervals, and the two protrusions are in concert with the two touch switches respectively.

It is to be understood, however, that even though relevant information and the advantages of the present embodiments have been set forth in the foregoing description, together with details of the functions of the present embodiments, the disclosure is illustrative only; and changes may be made in detail, especially in the matters of shape, size, and arrangement of parts within the principles of the present embodiments to the full extent indicated by the broad general meaning of the terms in which the appended claims are expressed.

What is claimed is:

1. A touch input device comprising:
   a touch pad with a floating side;
   an actuating member being a metallic strip comprising two lower end portions and a raised middle portion and a protrusion positioned in the middle of the raised middle portion; and
   a switch positioned on the touch pad corresponding to the protrusion, wherein the floating side is permitted to move to enable the switch to generate input commands when a pressure is exerted on the floating side.

2. The touch input device of claim 1, wherein the touch pad further comprises a fixing side opposite to the floating side, the fixing side is fixed to an object to secure the touch pad.

3. The touch input device of claim 2, further comprising a supporting member, the supporting member is attached to the bottom of the touch pad, one side of the supporting member is secured to the object, and the other side of the supporting member is free and corresponding to the floating side.

4. The touch input device of claim 3, wherein the touch input device comprises a frame defining a plurality of first securing posts to fix the supporting member.

5. The touch input device of claim 3, wherein the supporting member is made of metal.

6. The touch input device of claim 1, further comprising an elastic member providing a force to enable the touch pad to return to the original state when the touch pad is moved down.

7. The touch input device of claim 6, wherein the elastic member is below and supporting the floating side.

8. The touch input device of claim 1, further comprising an actuating member, the actuating member being positioned below the touch pad and comprising a protrusion which comes into contact with the switch to actuate the switch when the touch pad is moved down.

9. The touch input device of claim 1, wherein there is a space between the protrusion and the switch, the switch comprises a touch point in accordance with the protrusion.

10. The touch input device of claim 1, wherein the switch comprises two touch points positioned on two opposite ends of the switch, the two touch points are in accordance with two opposite ends of the floating side.

11. The touch input device of claim 10, wherein the touch input device comprises two elastic members, the two elastic members respectively supports the two opposite ends of the floating side, and provides a force to enable the touch pad to return to the original state when the touch pad is moved down.

12. The touch input device of claim 10, wherein the actuating member is below the touch pad and the protrusion comes into contact with one of the touch points at once to actuate the switch when the touch pad is moved down.

13. The touch input device of claim 12, wherein the touch input device comprises a frame defining a plurality of first securing posts and a plurality of second securing posts, the actuating member is fixed on the frame by the plurality of second securing posts; and one end of the elastic member is attached to a free edge of the supporting member, the other end of the elastic member is bent toward the frame and secured to one of the second securing posts.

14. An electronic device comprising:
   a housing defining an opening;
   a touch pad mounted to the housing, and the upper surface of the touch pad protruding out of the housing via the opening, the touch pad comprising:
   a fixing side secured to the housing;
   a floating side opposite to the fixing side;
   an actuating member being a metallic strip comprising two lower end portions and a raised middle portion and a protrusion positioned in the middle of the raised middle portion; and
   a switch positioned at the touch pad, wherein the floating side is capable of operably being moved down to enable the switch to generate input commands.

15. The electronic device of claim 14, further comprising an elastic member, providing a force to enable the touch pad to return to the original state when the touch pad is moved down.

16. The electronic device of claim 14, the actuating member being positioned below the touch pad, and the protrusion which comes into contact with the switch to actuate the switch when the touch pad is moved down.

17. The electronic device of claim 16, wherein there is a space between the protrusion and the switch, the switch comprises a touch point in accordance with the protrusion.

18. The electronic device of claim 16, wherein the touch input device comprises a frame defining a plurality of second securing posts and a plurality of third securing posts, the actuating member is fixed on the frame by the plurality of second securing posts; and one end of the elastic member is attached to a free edge of the supporting member, the other end of the elastic member is bent toward to the frame and secured to one of the third securing posts.

19. The electronic device of claim 14, further comprising a supporting member, the supporting member is attached to the bottom of the touch pad and supports the touch pad, one side of the supporting member is secured to the housing, and the other side of the supporting member is free and corresponding to the floating side.

20. The electronic device of claim 19, wherein the touch input device comprises a frame defining a plurality of first securing posts to fix the supporting member.

* * * * *